3,438,420
PREPARATION OF CONCENTRATED
ALKYLLITHIUM SOLUTIONS
Vishva R. Rai, Parsippany, N.J., and Howard J. Schwartz, Gastonia, N.C., assignors to Lithium Corporation of America, Inc., New York, N.Y., a corporation of Minnesota
No Drawing. Filed July 25, 1967, Ser. No. 655,779
Int. Cl. B01d 1/22
U.S. Cl. 159—49      5 Claims

ABSTRACT OF THE DISCLOSURE

A method of concentrating solutions of alkyllithiums, particularly n-butyllithium, in a volatile organic solvent such as hexane or heptane which involves flowing a thin film thereof along a heated surface for a short residence time, particularly of the order of about 20 seconds or less, while maintaining the heated surface at a temperature below the decomposition temperature of said alkyllithium, particularly in the range of about 75° to 80° C. The solution to be concentrated advantageously is passed along the surface in a downward direction and is recovered in concentrated form at the lower end thereof ready for shipment or storage.

BACKGROUND OF THE INVENTION

The usual method of concentrating dilute organic solvent solutions of alkyllithiums, exemplified particularly by n-butyllithium, has involved placing a small batch of such a solution in a heating vessel and heating the solution from ambient temperature to elevated temperatures, for instance about 75° C., over a long period to drive off the volatile organic solvent. Apart from the long time periods required to obtain a concentrated solution of the n-butyllithium or other alkyllithiums by this practice, careful control of temperature, especially in the final stages of heating, is essential since a slight fluctuation in the final solution temperature can result in side reactions which adversely affect the alkyllithium assay. In addition, in the batch method of concentrating such solutions, the possibility of loss of the entire batch due to human error or malfunction of equipment is ever present. Furthermore, the batch method generally necessitates pumping of the concentrated solution from the heating vessel to another container either for shipment or storage. Because of the pyrophoric nature of the alkyllithium in the concentrated solution, transfer of the concentrated solution from the heating vessel to another container must take place in an essentially closed system under an inert atmosphere.

SUMMARY OF THE INVENTION

The invention will be described hereafter in connection specifically with the concentration of solutions of n-butyllithium, where it has its most important advantages, but it is also useful in the concentration of organic solvent solutions of other alkyllithiums such as propyllithiums, isobutyllithium, t-butyllithium, amyllithiums and hexyllithiums and cyclohexyllithium.

Briefly, the method of the present invention involves converting a dilute solution of n-butyllithium in a volatile organic solvent, inert to the n-butyllithium, to a state permitting ready and facile transfer of heat therethrough, and then subjecting the dilute solution while in this condition to substantially uniform heat to effect rapid removal of the volatile organic solvent. In accordance with the preferred practice of the invention, the dilute n-butyllithium solution is mechanically converted to a thin film which is then allowed to flow in a downward direction along a heated surface. The thin film of the dilute solution is maintained in contact with the heated surface for a period of a fraction of a minute in a single pass and, thereafter, is collected directly, in highly concentrated form, in shipping or storage containers, as desired. The method is an essentially continuous one and can be carried out in far less time than is required for the conventional batch method. In addition, the method enables the quality of the end product to be carefully controlled at all times thereby eliminating the possibility of loss of any appreciable quantities of solution due to problems which may arise during processing. Furthermore, direct collection of the concentrated product in shipping or storage containers, as it leaves the heated surface, eliminates the need for, and the problems of, pumping the concentrated product from one point to another as in the case of the conventional batch method. Concentrated n-butyllithium solutions prepared by the method of the present invention typically have an assay of active and total base of at least 90%, usually of the order of 92% or 93% and 95%, respectively.

DESCRIPTION OF THE PREFERRED EMBODIMENTS

The concentration of n-butyllithium in the dilute starting solutions employed in the method of this invention is variable. However, from the standpoint of practical considerations, it is preferred to utilize solutions comprising, by weight, from about 20% to 30% n-butyllithium in a volatile organic solvent. Solutions of this type are conventionally prepared by reacting dispersed lithium metal with n-butyl chloride in an organic solvent which is inert to the reactants and to the formed n-butyllithium, particularly normally liquid aliphatic (including cycloaliphatic) hydrocarbons such as n-hexane, n-heptane, n-pentane and cyclohexane. The lithium chloride byproduct of the reaction is then removed by filtration.

While various types of equipment can be used for converting the dilute starting solution to a state permitting ready and facile transfer of heat therethrough, and then subjecting it to a heated surface, it is especially advantageous to employ apparatus of the type comprising a vertical, cylindrical evaporator section surrounded by a heating jacket, a separator section with stationary baffles, a rotor extending through both the separator and the evaporator sections, and a condenser. Units of this construction are available commercially and are disclosed in various patents.

In utilizing apparatus of the type described to carry out the method, the dilute starting solution is introduced at a preselected rate through a feed inlet above the evaporator section. The rotor blades act to distribute the solution over the inner generally cylindrical walls of the evaporator section in the form of a thin, highly turbulent film. The film flows downwardly by gravity, in the form of a substantially even distribution over the surface of the inner walls of the evaporator, while simultaneously undergoing rapid and intensive evaporation due to the heat transferred from the heating jacket to the baffles and the walls of the evaporator section. Film thickness, while variable, is generally most desirably in the range of about 0.03 to 0.06 inch, more or less. The concentrated solution is discharged at the lower end of the unit and, if desired, cooled, or passed directly into shipping or storage containers. The vapors produced by the evaporation are drawn upwards in counterflow to the liquid and pass overhead through an overhead vapor line and are condensed.

In those instances in which the concentrated solution as it issues from the evaporator is desired to be cooled, this can desirably be done, for instance, by cooling with chilled heptane at −40° to −50° C. although this may result in condensing hydrocarbon vapors and diluting the concentrated solution. It is more desirable, generally, where cooling is employed, to use a mineral oil coolant at a temperature slightly above 20° S. so as to avoid condensing of hydrocarbon vapors.

The rate of feed of the dilute starting solution into such a unit is variable. Generally speaking, feed rates of the order of 80 to 120 pounds per hour are employed with optimum results being attained with a feed rate of approximately 100 pounds per hour for a unit containing 1.4 ft.$^2$ of heating area. The discharge rate of the concentrated solution under such circumstances will range from about 25 to 30 pounds per hour. Feed and discharge rates of larger units will be proportionately greater.

As indicated, the time periods involved in converting the dilute starting solution to a concentrated solution are extremely short. In carrying out the method with an evaporator unit of the type described, concentration of a dilute starting solution comprising, by weight, from about 20–30% n-butyllithium, can be achieved in less than 20 seconds, usually in from 5 to 10 seconds, namely, the time for the film to travel the length of the evaporator section in a single pass. A single pass through the evaporator unit is, of course, most desirable and will, generally, be adequate.

The temperatures employed in effecting evaporation of the organic solvent from the dilute starting solution should be maintained below the level at which heat degradation of the alkyllithium will occur. The generally optimum objectives of the invention are most advantageously attained, therefore, by maintaining the heated surface, along which the thin film of solution flows, at a temperature in the range of about 70° to 85° C., especially desirably from about 75° to 80° C., a temperature of about 78° C. being optimum in the case of n-butyllithium. When carrying out the method with an evaporator unit, inlet temperatures of the heating fluid of the order of 95° to 105° C., usually 100° C., may be employed to bring the dilute starting solution up to temperature more quickly.

The conversion of a dilute organic solvent solution of n-butyllithium to a concentrated solution having an active base and total base assay in excess of 90% is enhanced, augmented and promoted by carrying out the method under a vacuum of at least about 25 inches of mercury and an operating pressure of the order of 15 to 150 mm. of mercury. In accordance with the preferred aspects of the method, a vacuum in the range of 26 or 27 to 30 inches of mercury, and an operating pressure ranging from 70 to 110, usually 100 mm. of mercury, are most advantageously employed.

The following examples are illustrative of the manner of carrying out the method of the present invention.

Example I

A solution comprising approximately 22%, by weight, n-butyllithium and 78%, by weight, n-hexane is fed into equipment of the type described above, having an evaporator with 1.4 square feet of heating area, under the following conditions:

| | |
|---|---|
| Feed rate _____lbs./hr__ | 100 |
| Inlet temperature of heating fluid _____° C__ | 100 |
| Operating pressure _____mm. Hg__ | 100 |
| Vacuum _____Hg__ | 26″ |
| Condenser temperature _____° C__ | −10 |
| Bottom temperature _____° C__ | 80 |
| Concentrated product rate _____lbs./hr__ | 25 |
| Residence time in evaporator _____seconds | 10 |

The concentrated product is a pyrophoric, light-yellow colored liquid which assays at 95% total base and 93% active base.

Example II

Several runs under varying conditions are made with the apparatus used in Example I employing 22% n-butyllithium in n-hexane, in one-pass operations. The results are given in the following table:

TABLE

| Run No. | 1 | 2 | 3 | 4 | 5 | 6 | 7 |
|---|---|---|---|---|---|---|---|
| Bottom rate, lb./hr | 18.5 | 24.5 | 24 | 24.5 | 27 | 24 | 22.5 |
| Bottom temp., ° C | 70 | 68 | 85 | 68 | 83 | 82 | 86 |
| Oper. pressure, Hg mm | 30 | 30 | 15 | 100 | 100 | 140 | 100 |
| Inches Hg vacuum | 29 | 29 | 29.5 | 26 | 26 | 24.5 | 26 |
| Heat up temp., ° C | 82 | 82 | 95 | 95 | 100 | 100 | 100 |
| Feed rate, lb./hr | 75 | 90 | 94 | 90 | 105 | 94 | 94 |
| Active base, percent | 94.65 | 94.09 | 96.40 | 91.74 | 91.70 | 92.59 | 90.56 |
| Total base, percent | 96.63 | 95.56 | 97.00 | 92.41 | 94.76 | 94.51 | 92.7 |

It will be understood that it is desired, for optimum operations, that the difference between the Active Base and Total Base be as low as possible, advantageously less than 2% and, better still, less than 1.5% or even less.

Where alkyllithiums other than n-butyllithium are involved, temperature conditions can be varied in the light of the degradation temperature of the particular alkyllithium.

What is claimed is:
1. In a method of concentrating dilute solutions of alkyllithiums selected from the group consisting of propyllithiums, butyllithiums, amyllithiums, hexyllithiums and cyclohexyllithium in a volatile, inert organic solvent comprising forming such a solution into a thin film permitting ready and facile transfer of heat therethrough, flowing the film along a heated surface, said surface being maintained at a temperature below that of the degradation temperature of the alkyllithium, maintaining the film in contact with the heated surface for less than 1 minute in any single pass, and recovering a concentrated solution of the alkyllithium.

2. A method in accordance with claim 1 wherein the temperature is in the range of about 70° to 80° C. and the time is from 5 to 10 seconds.

3. A method in accordance with claim 2 wherein a vacuum of at least about 25 inches of mercury is applied to the solution as it is being heated.

4. A method in accordance with claim 3 wherein the dilute solution comprises, by weight, from about 20–30% n-butyllithium and from 80–70%, by weight, of a volatile organic solvent selected from the group consisting of n-hexane and n-heptane.

5. A method in accordance with claim 4 wherein the dilute solution is formed into a thin film by a rotor, and the heated surface comprises heated baffles associated with the rotor, the thin film is turbulent, and moves downwardly by gravity.

References Cited

UNITED STATES PATENTS 2,938,866   5/1960   Engel et al. _____ 203—89 X
2,987,558   6/1961   Blitzer et al. _____ 260—665
3,087,896   4/1963   Kamienski et al. _____ 260—665

NORMAN YUDKOFF, Primary Examiner.

J. SOFER, Assistant Examiner.

U.S. Cl. X.R.

260—665, 704; 203—89